United States Patent

Yamada et al.

Patent Number: 5,589,299
Date of Patent: Dec. 31, 1996

[54] CARBON ELECTRODE FOR NONAQUEOUS SECONDARY BATTERY, FABRICATION METHOD FOR THE SAME AND NONAQUEOUS SECONDARY BATTERY USING THE SAME

[75] Inventors: Kazuo Yamada, Kitakatsuragi-gun; Takehito Mitate, Yamatotakada; Tetsuya Yoneda, Nabari; Naoto Nishimura, Kitakatsuragi-gun, all of Japan

[73] Assignee: Sharp Kabushiki Kaisha, Japan

[21] Appl. No.: 469,906

[22] Filed: Jun. 6, 1995

[30] Foreign Application Priority Data

Jul. 21, 1994 [JP] Japan ................... 6-169333
Mar. 28, 1995 [JP] Japan ................... 7-070058

[51] Int. Cl.⁶ ................... H01M 4/66
[52] U.S. Cl. ................... 429/218; 429/211; 427/122
[58] Field of Search ................... 429/218, 219, 429/223, 220, 232, 211, 44; 427/122; 502/325, 326, 330, 331

[56] References Cited

U.S. PATENT DOCUMENTS

| | | | |
|---|---|---|---|
| 3,347,708 | 10/1967 | Drengler | 429/44 |
| 4,645,713 | 2/1987 | Shinoya et al. | 427/122 |
| 4,863,814 | 9/1989 | Mohri et al. | 429/60 |
| 4,863,818 | 9/1989 | Yoshimoto et al. | 429/218 |
| 4,900,588 | 2/1990 | Tajima et al. | 427/122 |
| 4,968,527 | 11/1990 | Yoshimoto et al. | 427/122 |
| 5,030,529 | 7/1991 | Wada et al. | 429/218 |
| 5,482,797 | 1/1996 | Yamada et al. | 429/218 |

FOREIGN PATENT DOCUMENTS

| | | |
|---|---|---|
| 0434402A2 | 6/1991 | European Pat. Off. . |
| 59-18578 | 1/1984 | Japan . |
| 63-102167 | 5/1988 | Japan . |
| 63-24555 | 7/1988 | Japan . |
| 63-245855 | 10/1988 | Japan . |
| 4-92364 | 3/1992 | Japan . |
| 5-347155 | 12/1993 | Japan . |

Primary Examiner—Stephen Kalafut
Assistant Examiner—Carol Chaney
Attorney, Agent, or Firm—Nixon & Vanderhye

[57] ABSTRACT

A carbon electrode for a nonaqueous secondary battery comprising a conductive substrate doubling as a collector and carbon formed directly thereon, wherein the conductive substrate comprises a metal or a compound thereof having a catalytic action with respect to graphitization of a carbon material at a portion where carbon is required to be formed from a carbon precursor and comprises a metal or a compound thereof having no catalytic action with respect to graphitization of the carbon material at a portion where carbon is not required to be formed from the carbon source.

10 Claims, 5 Drawing Sheets

CARBON ELECTRODE FOR NONAQUEOUS SECONDARY BATTERY, FABRICATION METHOD FOR THE SAME AND NONAQUEOUS SECONDARY BATTERY USING THE SAME

BACKGROUND OF THE INVENTION

1. Field of the Invention

The present invention relates to a carbon electrode for a nonaqueous secondary battery, a fabrication method for the same and a nonaqueous secondary battery using the same. More particularly, the present invention relates to a carbon electrode for a nonaqueous secondary battery which has a high capacity and long life and is safe, a fabrication method for the same and a nonaqueous secondary battery using the same. The nonaqueous secondary battery of the present invention can be suitably used for driving electric sources for portable equipment such as electronic equipment, information equipment and the like.

2. Related Art

As miniaturization and weight reduction of portable equipment such as electronic equipment and information equipment rapidly progress, the secondary batteries which drive them have become increasingly important.

Because a lithium secondary battery is lightweight and has high energy density, it is considered promising as a driving electric source for portable equipment, therefore research and development thereof have been actively progressing. However, when a simple substance of lithium metal is used for a negative electrode, repetition of a charge and discharge cycle causes dentrites to generate and grow on the lithium metal, which lead to an internal short circuit, for which reason it is difficult to use lithium metal for a secondary battery. Also, lithium alloys such as lithium-aluminum alloy are proposed in place of lithium metal. However, because charge and discharge cycles or deep charging/discharging causes segregation of the alloy, sufficiently satisfactory characteristics are not obtained.

Accordingly, a battery using a negative electrode which utilizes the intercalation-deintercalation reaction of lithium ion with carbon as a host material was proposed. The research and development thereof has been progressing and has to a certain extent been put to practical use. A lithium secondary battery in which carbon is used for a negative electrode is excellent in terms of its cycle characteristic and safety. However, not only carbon materials have large variations in their structure carbon, but the physical properties and texture thereof greatly influence the performance of the electrode, which allows various types of carbon electrodes to be proposed.

For example, electrodes using relatively amorphous carbon for a negative electrode as shown in JP-A-61-111907 (the term "JP-A" as used herein means an unexamined published Japanese patent application) and JP-A-62-90863, electrodes using graphite for a negative electrode as shown in JP-A-60-182670, JP-A-60-221964, JP-A-4-155776 and JP-A-4-115467, and electrodes in which attention is paid to the texture of carbon, not the crystallinity of carbon as shown in JP-A-4-280068 and JP-A-4-342958 have been proposed. However, because all of these carbons are powdery or fibrous, a binder has to be mixed when they are used in electrodes. Accordingly, even if the carbon itself has excellent performance, problems will remain in terms of the cycle characteristic and amount of active material per volume when it is put to practical use in an electrode.

Meanwhile, a method in which carbon is deposited directly on a material capable of serving as a collector by a chemical vapor deposition method is proposed in JP-A-60-36315 and U.S. Pat. No. 4,863,814. The carbon electrodes produced by these methods show excellent characteristics. In particular, those prepared by depositing carbon directly on a metallic substrate not only do not require a binder but also have good current collection and therefore have high capacity and exhibit high cycle stability.

Further, those prepared by carrying a substance having a catalytic action with respect to polymerization for monomer on current collector as shown in JP-A-59-18578, or those prepared by depositing carbon on a substrate having a catalytic action on graphitization of carbon materials as shown in U.S. Pat. No. 4,968,527 and U.S. Pat. No. 4,863,818 are available. In the former, polymer are used as a battery-active material, and the catalytic action is for polymerization of monomer. In the latter, however, it is known that because carbon having high graphitization is deposited at low temperatures with strong adhesion, carbon electrodes having high capacity and an excellent cycle characteristic are obtained.

It is described in JP-A-4-92364 and JP-A-5-347155 that organic substances are impregnated into metallic porous bodies and carbonized to obtain carbon electrodes.

However, when carbon is formed either from a gas phase or a liquid phase, there is the defect that, when carbon is formed directly on the substrate, it is formed over the entire substrate. That is, in the case where electrodes prepared by depositing carbon directly on a conductive substrate having a catalytic action on the graphitization of carbon materials are used to produce batteries, a process for peeling off carbon deposited on a welded portion is required when welding the battery case and electrode. Also, applying a mask in order to make a portion where carbon is not deposited has been considered, but this masking is actually very difficult at the high temperatures required to form carbon electrodes by depositing carbon from a carbon source. Further, when the conductive substrate having a catalytic action is used, it is difficult to peel the carbon off because the carbon is deposited with strong adhesion.

As the need for a higher capacity battery increases, reducing the thickness of a metallic plate which is a collector (conductive substrate) or use of a three-dimensional structure in order to obtain a large current is required. However, in the electrode fabrication methods described above, because the collector metal itself acts as a catalyst, catalytic atom are caught in carbon when forming the carbon electrode, and therefore the collector becomes thin or narrow. Such a phenomenon, while giving sufficient current collection to an active material, makes it difficult to peel off only carbon deposited at a weld portion when carrying out welding to the battery case. Also, welding as is, without peeling the carbon, has caused problems in terms of contact resistance and strength, which in turn leads to the defects that the internal resistance of the battery increases and fabrication yield is lowered and, further, that reliability is greatly influenced.

SUMMARY OF THE INVENTION

Thus, the present invention provides a carbon electrode for a nonaqueous secondary battery comprising a conductive substrate doubling as a collector with carbon formed directly thereon, wherein the conductive substrate comprises a metal or a compound thereof having catalytic action with respect to graphitization of a carbon material at a portion where carbon is required to be formed from a carbon precursor and comprises a metal or a compound thereof having no catalytic action with respect to graphitization of the carbon material at a portion where carbon is not required to be formed from the carbon source.

Further, the present invention provides a fabrication method for a carbon electrode for a nonaqueous secondary battery, comprising the step of supplying a carbon material from a carbon source to a conductive substrate having a portion where a metal or an oxide thereof having catalytic action with respect to graphitization of the carbon material is present and carbon is required to be formed from a carbon source, and a portion where metal or an oxide thereof having no catalytic action with respect to the graphitization of the carbon material is present and carbon is not required to be formed from the carbon source, to thereby form carbon directly on the portion where carbon is required to be formed.

Also, the present invention provides a nonaqueous secondary battery comprising a rechargeable positive electrode, a rechargeable negative electrode and an ion conductor maintained in a separator conductor provided between both electrodes, wherein the negative electrode comprises the above-mentioned carbon electrode for a nonaqueous secondary battery.

DESCRIPTION OF THE PREFERRED EMBODIMENTS

Intensive research by the present inventors with the object of solving the defects described above have resulted in the finding that when carbon is formed directly on a conductive substrate doubling as a collector, carbon is not only graphitized on metal having a catalytic action but is also formed with strong adhesion, but carbon formed on metal having no catalytic action can easily be peeled off, such finding leading them to the present invention.

The catalytic action in the present invention means action which promotes graphitization in the course of carbonizing a carbon material.

Examples of the metals having catalytic action with respect to the graphitization of a carbon material in the present invention include iron, cobalt and nickel. Alloys are included in these metals. Examples of the alloys which can be used include nickel-iron, nickel-copper, iron-nickel-cobalt and stainless steel. Further, compounds thereof can be used and include, for example, halides such as chlorides, sulfates and bromides of these metals, and organic acid salts such as formates, acetates and benzoates of the metals. Among these, nickel is suitable for the collector since it prevents carbide from being formed on the conductive substrate and is preferred since it is relatively inexpensive.

The form of the portion where carbon is required to be formed from a carbon source on a conductive substrate includes tabular, reticulate and foamed forms and prepared form by pressing and solidifying fiber. Among them, the form having a large surface area such as a three-dimensional structure including reticulate, foamed and fibrous ones is preferred because it can increase the derivable current. For example, foamed nickel corresponds to such a three-dimensional structure.

On the other hand, examples of the metals having no catalytic action with respect to graphitization of carbon materials include copper, silver, gold, platinum, palladium, tin and lead. Further, compound thereof can be used and include, for example, halides such as chlorides, sulfates and bromides of these metals, and organic acid salts such as formates, acetates and benzoates of the metals. Of these, copper, silver and gold are preferred, and copper is further preferred in terms of cost and ease of coating.

A shape having a small surface area such as a plate is preferred as the shape of the portion where carbon is not required to be formed from a carbon source, because carbon is easily peeled off.

In the conductive substrate of the present invention, the portion on which carbon is not required to be formed from a carbon source is preferably a weld portion of a battery case which receives the conductive substrate by welding, because carbon is not formed or can be readily peeled off at such a portion, and therefore the strength of the weld and the contact resistance thereof are not influenced.

Here, because the conductive substrate described above doubles as the collector, not only is a binder not required but also current collection is good, thus an electrode exhibiting high cycle stability can be formed.

Next, a fabrication method for the above-mentioned carbon electrode for a nonaqueous secondary battery will be explained.

First, a fabrication method for the conductive substrate described above includes, for example:

(1) a method in which a portion of metal having catalytic action with respect to graphitization of a carbon material is coated with metal having no catalytic action with respect to graphitization of the carbon material, (2) a method in which a portion of metal having no catalytic action with respect to graphitization of a carbon material is coated with metal having catalytic action with respect to graphitization of the carbon material, (3) a method in which metal having no catalytic action with respect to graphitization of a carbon material and metal having such a catalytic action are welded to form a substrate, and (4) a method in which metal or a compound thereof having catalytic action with respect to graphitization of a carbon material is sintered on metal having no catalytic action with respect to graphitization of the carbon material to form a substrate.

A coating method in the fabrication method (1) described above is not especially limited, and any known method can be used. For example, any one of a vapor deposition method utilizing heat evaporation under high reduced pressure, a sputtering method utilizing heat evaporation and ion impact, an electrolytic plating method, a non-electrolytic plating method, a coating method in which paste containing dispersed metallic powder is coated, and a method in which heat treatment is applied to carry out sintering after coating can be used. Among these, the electrolytic plating method and the non-electrolytic plating method are preferred because of low cost and ease coating condition control.

For example, when the electrolytic or non-electrolytic plating method is carried out, a substrate is washed, subjected to sensitization treatment in a prescribed solution and activation treatment and then dipped in a plating bath, providing a coating. Here, the plating amount can be controlled by changing the temperature of the plating bath, the concentration of metal ions, the dipping time, current density and current amount.

Metal having no catalytic action is coated in the manner described above after coating a portion which is not required to be coated with a masking agent having chemical resistance, heat resistance and an insulating property, whereby only a required portion can be coated. When a plating method is used as a coating method, a method in which only the required portion is dipped in a plating bath is included as well.

A thickness of metal having no catalytic action falls in the range of 0.01 μm or more, preferably 0.1 to 500 μm. When the thickness is smaller than 0.01 μm, the catalytic action cannot be sufficiently suppressed for the reason that an alloy is formed with a metal having a catalytic action for coating carbon, and carbon having strong adhesion is formed as well at a coated portion. Consequently this is not preferred.

The form of the metal having no catalytic action is not especially limited, and a plate can be used. In particular, it is preferred that the metal having no catalytic action is in a shape having small surface area. This is because the smaller the surface area, the more easily the carbon is peeled off.

In method (2) described above, the same process as that in method (1) described above can be used for a process for coating with metal having a catalytic action.

The welding process in the forming method (3) described above is not especially limited, and any publicly known process can be used. For example, a spot welding process, a supersonic welding process and the like can be used.

The shapes of metal having catalytic action and metal having no catalytic action are not especially limited, and a plate can be used. In particular, it is preferred that the metal having catalytic action has a shape with large surface area such as a three-dimensional structure and the metal having no catalytic action has a shape with small surface area. This is because the larger the surface area, the more effectively the catalyst acts, and the smaller the surface area, the more easily the carbon is peeled off.

The compounds of the metals having catalytic action in the forming method (4) described above include halides such as chloride, sulfide and bromide of these metals, inorganic acid salts such as carbonate and nitrate, and sulfates, oxides and hydroxides of the metals. Further, organic acid salts such as formate, acetate, benzoate and the like are included.

The sintering method is not particularly limited, and any known method can be used. These include, for example, a method in which powder comprising the metal and/or a compound thereof described above is solidified by pressing and then sintered, and a method in which metal and/or a compound thereof is mixed with a solution and coated, followed by sintering. Here, the metal and compound thereof used may be any form, such as granule and fiber.

The shapes of the metal having catalytic action and the metal having no catalytic action are not specifically limited. It is preferred that the metal having catalytic action has a large surface area form such as a three-dimensional structure. On the other hand, it is preferred that the metal having no catalytic action has a small surface area. This is because the larger the surface area, the more effectively the catalyst acts, and the smaller the surface area, the more easily the carbon is peeled off.

Carbon is formed directly on the conductive substrate obtained by the fabrication method described above to form a carbon electrode. The method for forming carbon is not particularly limited, and a gas phase method, a liquid phase method and a solid phase method are included.

The gas phase method is a method in which carbon material gas or a carrier gas such as argon therewith is transported in a heated electric furnace to form carbon from gas phase. With respect to the carbon material gas which can be used in the gas phase method, gas which is vapor at normal temperatures such as propane can be used as is, and in the case of organic materials which are liquids at normal temperatures such as benzene, these can be used by vaporizing them by means of bubbling.

The liquid phase method is a method in which a carbon precursor is heat-treated in an inert atmosphere to form carbon. The carbon precursor which can be used in the liquid phase method includes tar and pitch. In the liquid phase method, programming rate and pressure atmosphere when heat treating under reduced pressure and pressurization can be suitably selected according to the carbon precursors.

Further, the solid phase method is a method in which a solid carbon precursor such as a polymer material is heat-treated to form carbon. Examples of the materials which can be used in the solid phase method include a furan resin, phenol resin, polyvinylidene chloride, cellulose and sugar. In the solid phase method, it is possible as well to mold a material in a prescribed form by heating or dissolving it in a suitable solvent before heat-treatment.

The carbon-forming temperature range is different according to the carbon materials and fabrication method, and ranges from the temperature at which carbon starts to form up to a temperature close to the melting point of the metal having catalytic action. Further, with respect to the liquid phase method and the solid phase method, carbon materials can be subjected to flame resistance treatment or infusibility treatment at 200° C. to 400° C. prior to carbon formation in an active environment such as in air, differing according to the carbon material used.

The present invention is characterized as well in that the electrode described above is used as a negative electrode to constitute a nonaqueous secondary battery. The nonaqueous secondary battery of the present invention is explained below.

A positive electrode in the nonaqueous secondary battery of the present invention comprises a positive electrode active material and a conductive material, a binder and, optionally, a solid electrolyte added thereto.

The positive electrode active material includes, for example, oxides containing lithium. More specific examples include $LiCoO_2$, $LiNiO_2$, $LiFeO_2$, $LiMnO_2$, $LiVO_2$, $Li_xM_y\text{-}N_zO_2$ of this series (wherein M is Fe, Co, Ni or Mn, N represents transition metal, preferably metal of 4B group or 5B group, $0 \leq X \leq 1$, $0 \leq Y \leq 1$, $0 \leq Z \leq 1$), $LiMn_2O_4$, and $LiMn_{2-x}N_yO_4$ (wherein N represents transition metal, preferably metal of 4B group or 5B group, $0 \leq Z \leq 2$).

The conductive material is not specifically limited, any known material being usable. For example, carbons such as carbon black (acetylene black, thermal black, channel black and the like), graphite powder and metal powder can be used.

The binder is not specifically limited, any known material being usable. There can be used, for example, fluorine series polymers such as polytetrafluoroethylene and polyvinylidene fluoride, polyolefine series polymers such as polyethylene and polypropylene, and synthetic rubbers.

The solid electrolyte is not specifically limited, any known inorganic or organic material being usable. The inorganic solid electrolyte includes, for example, lithium nitride, halides, oxygen acid salts and the like, more specifically $Li_3N$, $LiI$, $Li_3N-LiI-LiOH$, $LiSiO_4-LiI-LiOH$, $Li_3PO_4-Li_4SiO_4$, phosphorus sulfide compounds, and $LiSiS_3$. The organic solid electrolyte includes, for example, polyethylene oxide derivatives or polymers containing these derivatives, polypropylene oxide derivatives or polymers containing these derivatives, and phosphate polymers.

The mixing ratios of the conductive material and the binder to the positive electrode active material are preferably 5 to 50 parts by weight of the conductive material and 1 to 30 parts by weight of the binder per 100 parts by weight of the active material. The conductive material of less than 5 parts by weight or a binder of more than 30 parts by weight increases the resistance or polarization of an electrode and decreases discharge capacity, whereby a practical nonaqueous secondary battery cannot be produced. The conductive material of more than 50 parts by weight (provided that the part by weight is varied according to the type of conductive material) reduces the active material amount contained in an electrode and therefore decreases discharge capacity as the positive electrode. The binder of less than 1 part by weight removes binding ability, and the binder of more than 30 parts by weight reduces the active material amount contained in the electrode, as is the case with the conductive material. Further, as described above, it is not practical because the resistance or polarization of the electrode increases, decreasing the discharge capacity. When producing the positive electrode, heat treatment is preferably carried out at temperatures close to the melting point of each binder in order to enhance adhesion.

For the ion conductor, for example, an organic electrolyte, solid polymer electrolyte, solid inorganic electrolyte, and fused salts can be used. Of these, the organic electrolyte can be suitably used.

Examples of solvents for the organic electrolyte include esters such as propylene carbonate, ethylene carbonate, butylene carbonate, diethyl carbonate, dimethyl carbonate, methyl ethyl carbonate, and -butyro-lactone, tetrahydrofuran substituted tetrahydrofurans such as 2-methyltetrahydrofuran, ethers such as dioxolane, diethyl ether, dimethoxyethane, diethoxyethane, and methoxyethoxyethane, dimethylsulfoxide, sulfolane, methylsulfolane, acetonitrile, methyl formate, and methyl acetate. These can be used singly or as a mixed solvent of two or more types.

Examples of the electrolytes includes lithium salts such as lithium perchlorate, lithium borofluoride, lithium phosphofluoride, arsenic lithium hexafluoride, lithium trifluoromethanesulfonate, lithium halides, and lithium chloroalminate. These can be used singly or as a mixed solvent of two or more types thereof. The electrolyte is dissolved in one or more of the solvents selected from the above to prepare an electrolyte. The solvents and the electrolytes used in preparing the electrolytes are not limited to those described above and the following can also be used.

The solid inorganic electrolytes include, for example, lithium nitride, halides hydroxide or oxygen acid salts. More specifically, they include $Li_3N$, $LiI$, $Li_3N-LiI-LiOH$, $LiSiO_4-LiI-LiOH$, $Li_3PO_4-Li_4SiO_4$, phosphorus sulfide compounds, and $LiSiS_3$. The organic solid electrolytes include, for example, polyethylene oxide derivatives or polymers containing these derivatives, polypropylene oxide derivatives or polymers containing these derivatives, and phosphate polymers.

A separator for maintaining these electrolytes includes non-woven seet and woven fabrics of electrically insulative synthetic resin fiber, glass fiber and natural fiber, and moldings of powder of alumina. Among them, non-woven fabrics of synthetic fibers of polyethylene or polypropylene are preferred in terms of quality stability. Those provided with a function wherein separators are fused by heat to shut off the positive electrode from the negative electrode when batteries abnormally generate heat are included in these fabrics of synthetic fibers, and therefore they can suitably be used as well from the viewpoint of safety. The thickness of the separators is not particularly limited. They can have thicknesses in which a required amount of the electrolyte can be maintained and short circuiting between the positive electrode and the negative electrode can be avoided. Usually, those of a degree of 0.01 to 1 mm, preferably 0.02 to 0.05 mm can be used.

The nonaqueous secondary battery can have a prismatic-type, cylindrical-type, coin-type or button-type shape.

In the above, welding of a conductive substrate with a battery case has been described. The fabrication method of the present invention can also be applied to partial reinforcement when using a thinner collector.

The carbon electrode for a nonaqueous secondary battery of the present invention will not be cut in welding because the conductive substrate is not damaged when forming carbon. This not only facilitates fabrication of the current collecting portion of the electrode but also improves the yield of the battery. Also, because carbon can be formed at a required portion, not only is the internal resistance of the battery reduced and capacity increased but the current characteristics thereof improve. Further, because the cycle characteristic is improved, the reliability of the battery is enhanced. In addition, not only can a process for peeling carbon off in order to form a current collecting portion be omitted but strength can also be maintained. Accordingly, because the collector metal itself can be prevented from being removed with the carbon when the carbon is peeled off, as was the case in the past, the carbon can be easily peeled off, and a thin or fine conductive substrate can be used. This results in not only increasing the energy density of the battery but also makes it capable of having a large capacity. Further, fabrication is facilitated because carbon is required to be formed only on one face.

EXAMPLES

The present invention will be concretely explained below with reference to the examples, but is not limited thereto. The electrodes used in the examples were produced according to the flow charts shown in FIG. 1 and 2. The details of the respective processes were shown in the examples.

Example 1

Nickel foil having an area of $4 \times 2$ cm$^2$ and a thickness of 50 μm was used as metal 1 having catalytic action. A portion of the surface thereof was plated with copper as metal 2 having no catalytic action by the following method.

First, the nickel foil was washed (refer to FIG. (a)). Then, 100 g of $CuSO_4$ was dissolved in 500 ml of water, and 15 ml of concentrated sulfuric acid was dripped thereon while stirring the solution. Further, 3 g of sodium 1,5-naphthalenedisulfonate was added to prepare a plating bath for electrolysis. This plating bath was maintained at 20° C., and electrolytic copper plating was performed at a current density of 2 mA/cm$^2$ (refer to FIG. 1(b)). The plating thickness was 3 μm.

Figure 1A:
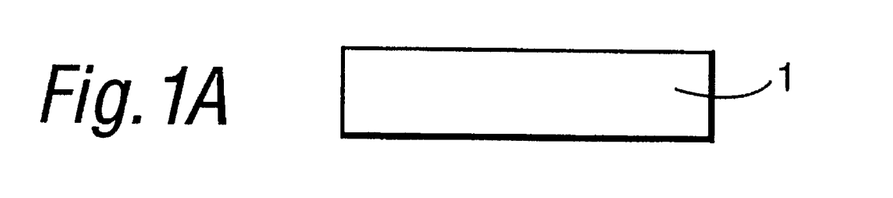
FIG. 1 is a flow chart of the fabrication method of the present invention.
Figure 1B:
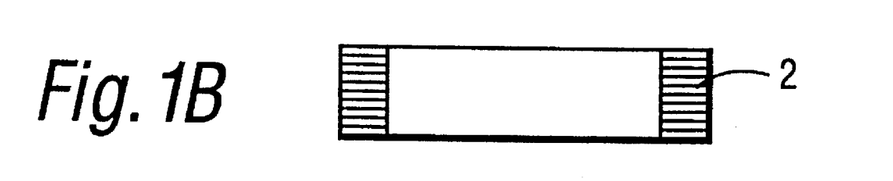
Figure 1C:
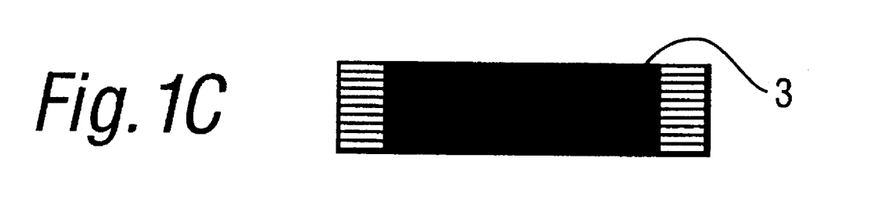
Figure 5:
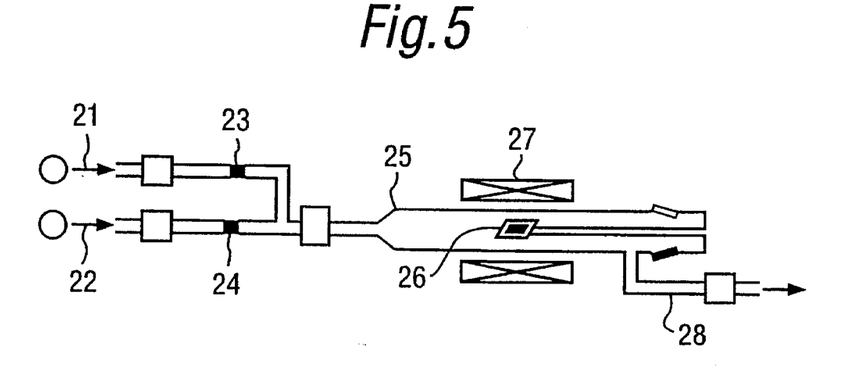
FIG. 5 is a schematic drawing illustrating a carbon depositing apparatus used for a fabrication method for the carbon electrode of the present invention.

The conductive substrate plated with copper in the manner described above was kept on the sample table of a CVD equipment shown in FIG. 5, and carbon was deposited in the following conditions (refer to FIG. 1(c)). In FIG. 5, 21 indicates a carrier gas supplying line, 22 a reaction gas supplying line, 23 and 24 needle valves, 25 a reaction tube, 26 a sample holder, 27 a heating furnace, and 28 an exhaust arrangement.

Propane was used for the carbon material gas and argon for the carrier gas. Propane which was the carbon material gas was maintained at a flow rate of 0.53 mole/hour and a gas flow speed of 25.5 cm/minute, and carbon was deposited at a deposition temperature of 900° C. for one hour, whereby a carbon electrode was obtained. The deposited amount of carbon was 5.3 mg.

Figure 1D:
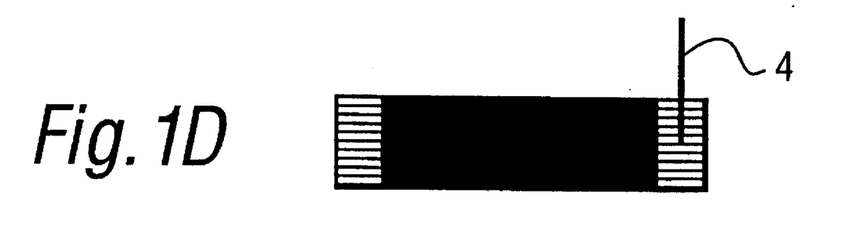
Figure 3:
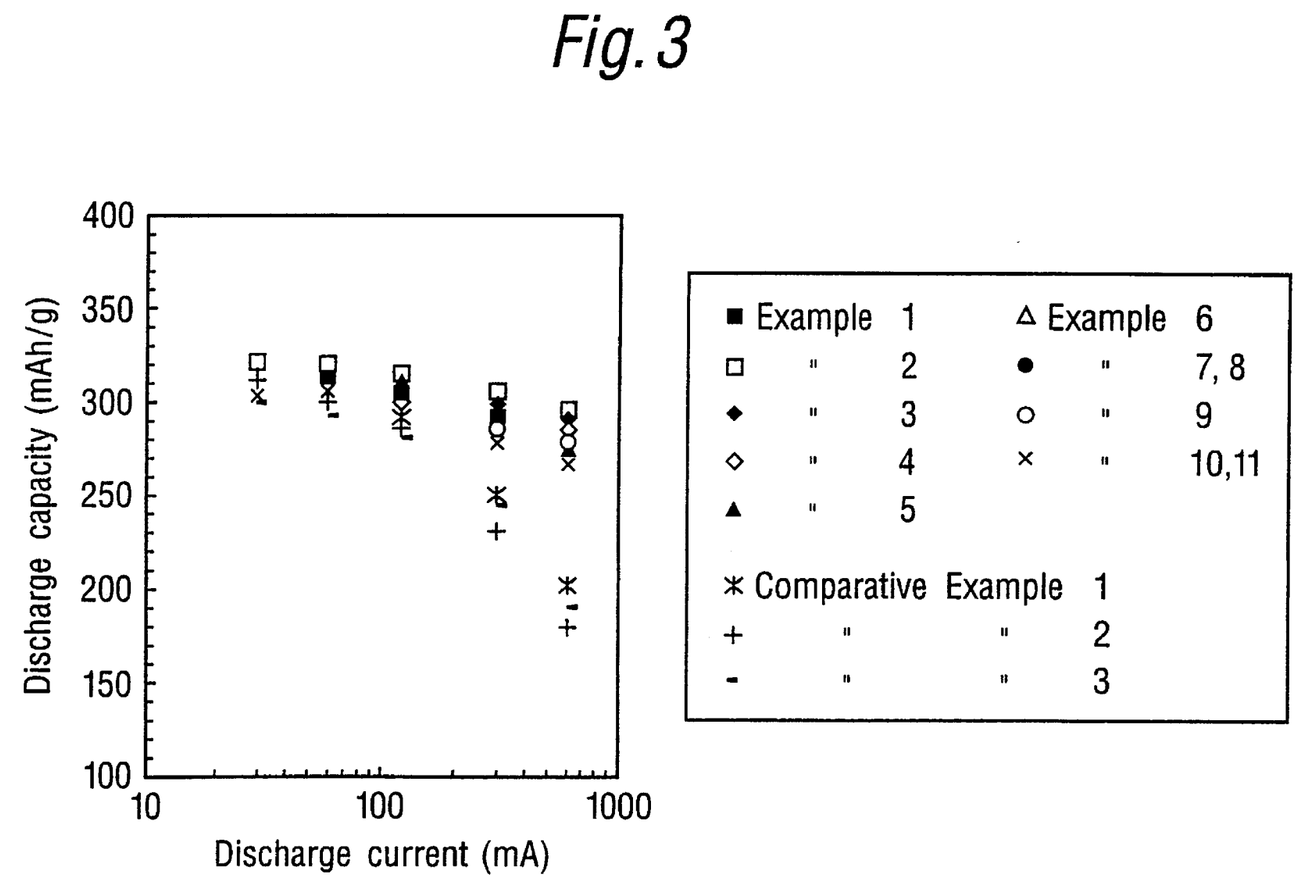
FIG. 3 is a drawing showing the discharge current density dependency of electrode capacities in Examples 1 to 11 and Comparative Examples 1 to 3.

A current collecting tab 4 was attached to the carbon electrode thus obtained, and thus an electrode for evaluation was prepared (refer to FIG. 1(d)). This was dried under reduced pressure at 150° C. for 5 hours and then evaluated as an electrode. A three electrode system method was used for evaluation, and lithium was used for a counter electrode and a reference electrode. An electrolyte was prepared by dissolving lithium perchlorate of 1 moldm$^{-3}$ in the 1:1 mixed solvent of ethylene carbonate and diethyl carbonate. In a charge/discharge test, charge was carried out up to 0V at a current value of 30 mAg$^{-1}$ and subsequently discharge was carried out up to 1.5V at the respective current values. The discharge current density density dependency of the electrode was checked by this method. The result is shown in FIG. 3.

Example 2

Foamed nickel having a dimension of 4×2 cm$^2$ and a thickness of 50 mm was used as the metal having catalytic action, and this was subjected to non-electrolytic copper plating. In the non-electrolytic copper plating, a mask was first produced so that only a portion of the substrate where a current collecting tab was welded was exposed, and sensitization treatment and activation treatment were then carried out using MAC-100 (manufactured by Okuno Chemical Ind. Co., Ltd.) and MAC-200 (manufactured by Okuno Chemical Ind. Co., Ltd.) as pretreatment solutions. Next, the pretreated substrate was dipped in the two-solution type of non-electrolytic copper plating baths of MAC-500A and MAC-500B (manufactured by Okuno Chemical Ind. Co., Ltd.), and copper plating was carried out at room temperatures while stirring the solution with a stirrer, whereby a conductive substrate was obtained as a collector. The area of the portion which had been subjected to copper plating was 0.5×0.5 cm$^2$, and the thickness of the plated copper was 2.1 μm. On the assumption that the total surface area was 10 times the area occupied by the plated copper, a change in weight by plating was measured, and the thickness of the plated copper was determined from a calculation based on the above measuring result.

Carbon was deposited on the collector thus obtained in the same conditions as those in Example 1 to obtain a carbon electrode. The deposited amount of carbon was 12.8 mg. The carbon electrode thus obtained was evaluated as an electrode in the same manner as that in Example 1, and discharge current density dependency was checked. The result is shown in FIG. 3.

Example 3

Nickel foil having a dimension of 4×2 cm$^2$ and a thickness of 50 μm was used as a metal having catalytic action, and silver was coated on a portion thereof by sputtering in the following manner.

First, a metal plate was superposed so that a portion of the nickel foil was exposed, and this was fixed on a sample table by a magnet. After the inside of a chamber was evacuated to about 10$^{-6}$ torr, argon gas was introduced to adjust the pressure to 5×10$^{-3}$ torr. In this atmosphere a target of silver was used to carry out sputtering at 200° C. for about 30 minutes, whereby a conductive substrate was obtained. The film thickness of the coated silver was 1.6 μm.

The conductive substrate obtained in the above manner was used to deposit carbon at the same material supplying rate as that in Example 1 at a deposition temperature of 800° C. for one hour, whereby a carbon electrode was obtained. The deposited amount of carbon was 6.3 mg. The carbon electrode thus obtained was evaluated in the same manner as that in Example 1, except that a solution prepared by dissolving lithium perchlorate of 1 moldm$^{-3}$ in the 1:1 mixed solvent of ethylene carbonate and propylene carbonate was used as an electrolyte. The result is shown in FIG. 3.

Example 4

Stainless steel foil (SUS 302 manufactured by Nicolas Co., Ltd.) having a dimension of 4×2 cm$^2$ and a thickness of 50 μm was used as the metal having catalytic action. A tape was applied so that a portion of the foil was exposed, and gold was deposited thereon, whereby a conductive substrate was obtained. The thickness of deposited gold was 0.8 μm.

Carbon was deposited on the conductive substrate obtained in the above manner at the same carbon material gas supplying rate as that in Example 1 at a deposition temperature of 1000° C., whereby a carbon electrode was obtained. The deposited amount of carbon was 6.1 mg. The carbon electrode thus obtained was evaluated in the same manner as that in Example 1, except that a solution prepared by dissolving lithium perchlorate of 1 moldm$^{-3}$ in the 1:1 mixed solvent of ethylene carbonate and γ-butyrolactone was used as an electrolyte. The result is shown in FIG. 3.

Example 5

An alloy foil of iron-nickel-cobalt having a dimension of 4×2 cm$^2$ and a thickness of 50 mm was used as metal having catalytic action, and was plated with copper in the same manner as that in Example 1, whereby a conductive substrate was obtained. The thickness of copper was 1.5 μm.

Carbon was deposited on the conductive substrate obtained in the above manner at the same carbon material gas supplying rate as that in Example 1 and a deposition temperature of 1000° C., whereby a carbon electrode was obtained. The deposited amount of carbon was 4.3 mg. The carbon electrode thus obtained was evaluated in the same manner as that in Example 1, except that a solution prepared by dissolving lithium perchlorate of 1 moldm$^{-3}$ in the 1:1 mixed solvent of ethylene carbonate and γ-butyrolactone was used as an electrolyte. The result is shown in FIG. 3.

Example 6

Figure 2A:
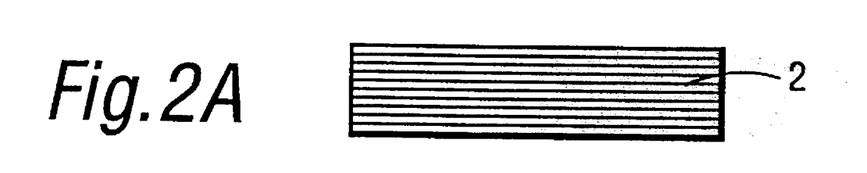
FIG. 2 is a flow chart of the fabrication method of the present invention.
Figure 2B:
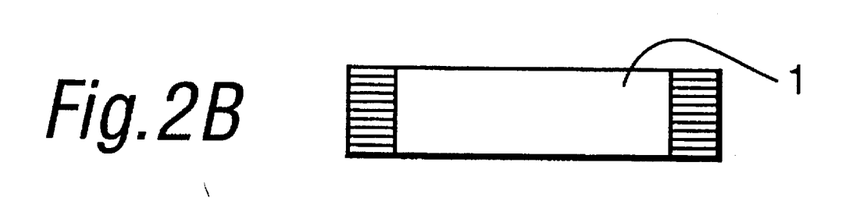

Foamed nickel (2×2 cm$^2$) was spot-welded on copper foil (2×3 cm$^2$, refer to FIG. 2(a)) having a thickness of 20 μm to thereby obtain a conductive substrate for forming a carbon electrode (refer to FIG. 2(b)).

Figure 2C:
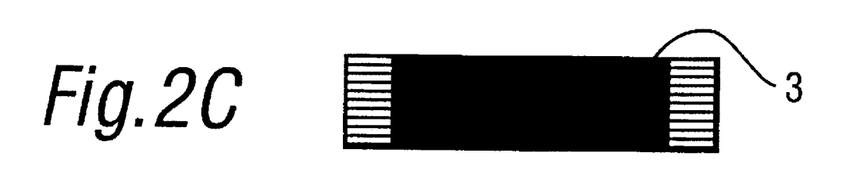

A quinoline soluble component contained in pitch was impregnated into the conductive substrate thus obtained. This was maintained at 300° C. for 2 hours in a nitrogen gas stream. Then, the temperature was elevated to 1000° C. and the conductive substrate was maintained at this temperature for 3 hours, thereby obtaining a carbon electrode (refer to FIG. 2(c)). It was found from an increase in the weight of the carbon electrode that the amount of carbon gained was 3.2 mg. Carbon was firmly deposited on the foamed nickel: the portion having catalytic action and the carbon deposited on the copper foil could be readily removed.

The carbon electrode thus obtained was evaluated as an electrode in the same manner as that in Example 1, and the discharge current density dependency thereof was checked. The result is shown in FIG. 3.

Example 7

Copper foil (2×3 cm$^2$) having a thickness of 20 μm was used as metal having no catalytic action (refer to FIG. 2(a)). Then, nickel powder was mixed with water to make a paste, and the paste was coated on the copper foil to 2×2 cm$^2$. Thereafter, the foil was dried at 60° C. for one hour and then baked at 1000° C. for 3 hours in a nitrogen gas stream, thereby obtaining a conductive electrode for forming a carbon electrode (refer to FIG. 2(b)). The nickel powder was firmly sintered on the copper foil.

The conductive substrate obtained in the above manner was used to deposit carbon at the same material supplying rate as that in Example 1 at a deposition temperature of 1000° C., obtaining a carbon electrode (refer to FIG. 2(b)). The deposited amount of carbon was 2.1 mg. The carbon electrode thus obtained was evaluated in the same manner as that in Example 1, except that a solution prepared by dissolving lithium perchlorate of 1 moldm$^{-3}$ in the 1:1:2 mixed solvent of ethylene carbonate, propylene carbonate and diethyl carbonate was used as an electrolyte. The result is shown in FIG. 3.

Example 8

Copper foil (2×3 cm$^2$) having a thickness of 20 μm was used as the metal having no catalytic action. Then, a powder of nickel oxide was mixed with water to make a paste, and the paste was coated on the copper foil to 2×2 cm$^2$. Thereafter, the foil was dried at 60° C. for one hour and then baked at 1000° C. for 3 hours in a nitrogen gas stream, thereby obtaining a conductive electrode for forming a carbon electrode. The nickel oxide powder was firmly sintered on the copper foil.

The conductive substrate obtained in the above manner was used to obtain a carbon electrode in the same manner as that in Example 6. It was found from an increase in the weight of the carbon electrode that the carbon formed was 2.8 mg. The carbon electrode thus obtained was evaluated in the same manner as that in Example 7. The result is shown in FIG. 3.

Example 9

The same substrate as that in Example 6 was used as a conductive substrate for forming carbon. Polyvinylidene fluoride dissolved in N-methyl-2-pyrrolidone was prepared for use as a carbon material. This was impregnated into a foamed nickel portion and baked at 1100° C. for 3 hours in a nitrogen gas stream, thereby obtaining a carbon electrode. It was found from an increase in the weight of the carbon electrode that the carbon formed was 1.2 mg. The carbon electrode thus obtained was evaluated in the same manner as that in Example 7. The result is shown in FIG. 3.

Example 10

Nickel foil having an area of 4×2 cm$^2$ and a thickness of 50 μm was used as the metal having catalytic action. Then, a copper powder was dispersed in water. This was coated on a portion of the nickel foil described above and dried, followed by heat-treating at 1100° C. in an inert environment and baking, whereby a conductive substrate was obtained.

The conductive substrate obtained in the above manner was used to form carbon directly on the substrate in the same manner as that in Example 1, thereby obtaining a carbon electrode. The deposited amount of carbon was 4.6 mg. The carbon electrode thus obtained was evaluated in the same manner as that in Example 1. The result is shown in FIG. 3.

Example 11

Copper foil (2×3 cm$^2$) having a thickness of 20 μm was used as the metal having no catalytic action. Then, an iron acetate powder was mixed with ethanol to make a paste, and the paste was coated on the copper foil to 2×2 cm$^2$. The foil was dried at 60° C. for one hour and then baked at 1000° C. for 3 hours in a nitrogen gas stream, whereby a conductive electrode for forming a carbon electrode was obtained. Iron acetate was converted to iron oxide, which was firmly sintered on the copper foil.

The conductive substrate thus used was used to obtain a carbon electrode in the same manner as that in Example 6. It was found from an increase in the weight of the carbon electrode that the amount of carbon formed was 1.7 mg. The carbon electrode thus obtained was evaluated in the same manner as that in Example 4. The result is shown in FIG. 3.

Comparative Example 1

Carbon was deposited in the same manner as that in Example 1, except that nickel foil not subjected to treatment was used as a metallic substrate. Then, carbon deposited on a portion on which a current collecting tab was welded was peeled off, and the current collecting tab was attached by spot welding to prepare a comparative electrode. The electrode was evaluated in the same manner as that in Example 1. The result is shown in FIG. 3.

Comparative Example 2

Foamed nickel was used as a metallic collector to deposit carbon in the same manner as that in Example 1 without coating it with a metal having no catalytic action. Because deposited carbon could not be peeled off from the electrode thus obtained, a current collecting tab was directly spot-welded as carbon was deposited to obtain a comparative electrode. The electrode was evaluated in the same manner as that in Example 1. The result is shown in FIG. 3.

Comparative Example 3

Carbon was deposited in the same manner as that in Example 4, except that stainless foil (SUS 302 produced by Nicolas Co., Ltd.) not subjected to treatment and having a thickness of 50 μm was used as a substrate having catalytic action to prepare a comparative electrode. The carbon electrode thus obtained was evaluated in the same manner as that in Example 1, except that a solution prepared by dissolving lithium perchlorate of 1 moldm$^{-3}$ in the 1:1 mixed solvent of ethylene carbonate and γ-butyrolactone was used as an electrolyte. The result is shown in FIG. 3.

As shown in Examples 1 to 11 and Comparative Examples 1 to 3 described above, using the electrodes of the present invention can control the deposition of carbon at a target location. Accordingly, because not only a process for peeling off the carbon is unnecessary but also an electrode having less resistance at welded portions can be obtained, an electrode having excellent current characteristics and high capacity can be obtained. It is found that in the case where a foamed metallic collector is used, carbon does not peel off and the present invention is more effective.

Example 12

Figure 7:
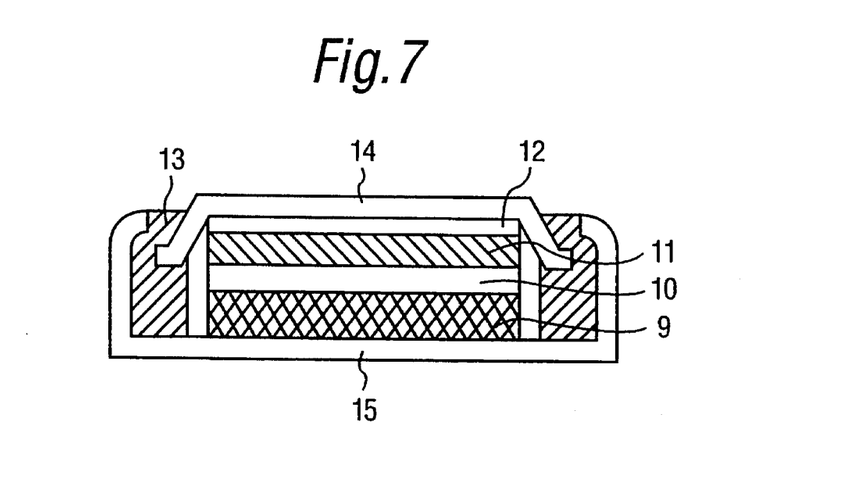
FIG. 7 is a cross-sectional drawing of a coin type secondary battery in the present invention.

The carbon electrode obtained in the same manner as that in Example 2 was used to produce a coin-type battery shown in FIG. 7 by the following method.

Figure 6:
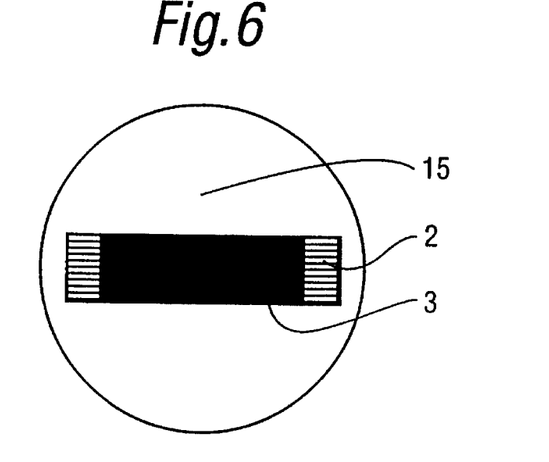
FIG. 6 is a plan drawing of a coin-type cell in the present invention.

The carbon electrode prepared in Example 2 was used as a negative electrode 9, and spot welding was carried out to connect one main face of this negative electrode 9 to a negative electrode case 15 (refer to FIG. 6). Next, a separator 10 was placed on the other main face of the above negative electrode 9 and a sealing packing 13 was inserted into the peripheral portion of the negative electrode case 15. An electrolyte was then impregnated into the separator 10 described above, and a battery case cover 14 on which a positive electrode 11 and a positive electrode current collecting plate 12 were welded in that order was disposed on the separator 10 and caulked to seal it, whereby a nonaqueous secondary battery was produced. Here, in the constitution of the battery described above, the positive electrode active material was excessively put, and regulated by the capacity of the negative electrode.

An electrode prepared by mixing a conductive material of 10 parts by weight and a binder of 10 parts by weight with LiCoO$_2$ and molding it to a pellet of φ 15 mm was used as the positive electrode 11 described above.

A solution prepared by dissolving lithium hexafluoride of 1 moldm$^{-3}$ in the 1:1 mixed solvent of ethylene carbonate and 2-methyltetrahydrofuran was used as the electrolyte described above.

A non-woven cloth of polypropylene was used as the separator 10 described above.

Figure 4:
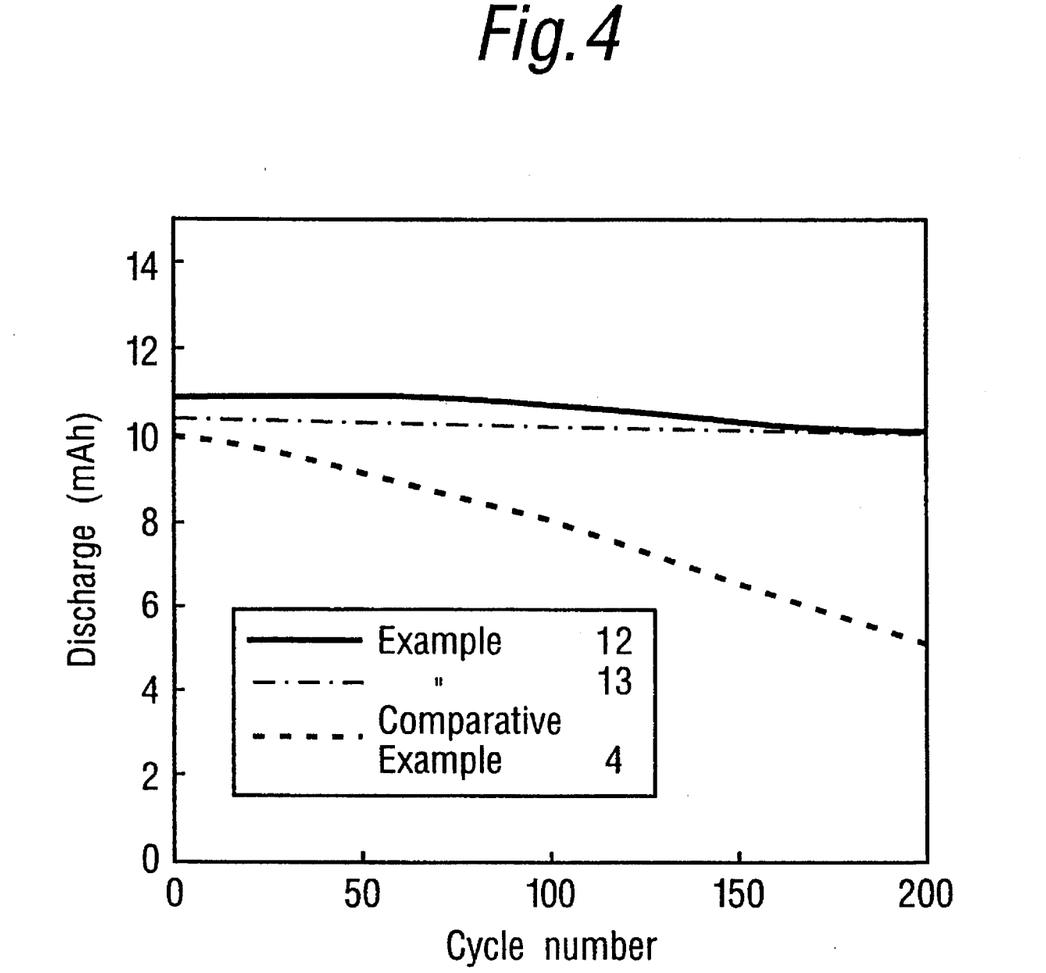
FIG. 4 is a drawing showing cycle characteristics of coin-type batteries in Examples 12 to 13 and Comparative Example 4.

A discharge test was carried out at a fixed current of 1 mA, and the potential range of charge and discharge was set to 2.7 to 4.1V. Then, the prepared battery was checked for cycle characteristic. The result is shown in FIG. 4.

Example 13

A carbon electrode obtained in the same manner as that in Example 6 was used to produce a coin-type battery in the same manner as that in Example 12, and the cycle characteristic thereof was checked. The result is shown in FIG. 4.

Comparative Example 4

A coin-type battery was produced and evaluated in the same manner as those in Example 12, except that an electrode obtained in the same manner as that in Comparative Example 2 was used as a negative electrode and spot-welded directly to a battery case. The result is shown in FIG. 4.

After evaluation, the battery was taken to pieces to observe the weld portion, and partial cracks were found. This was considered to be because a portion which remains as the collector of foamed nickel after the deposition of carbon becomes considerably fine and therefore is partially broken due to the repetition of expansion and compression caused by repetitive charges and discharges.

As shown in Comparative Example 4 described above, the peeling of carbon is difficult when a foamed conductive substrate is used. Accordingly, in conventional methods, there is no other way but to weld the current collecting tab to the substrate. It is difficult to provide a battery capable of withstanding cycles with such an electrode.

However, as shown in Examples 12 and 13 described above, the use of the electrode and the fabrication process of the present invention can provide a battery having an excellent cycle characteristic. Further, because the inferiority due to the cause shown in Comparative Example 4 is removed, yield can be improved.

In the nonaqueous secondary battery of the present invention, because the strengths of carbon and a conductive substrate are increased at desired portions but catalytic action is suppressed at undesired portions and carbon is not deposited, an electrode having less resistance at weld portions and excellent current characteristics can be obtained.

Further, the yield of batteries can be improved by the conductive substrate not being cut during welding.

Because a portion where carbon is not required to be formed from a carbon source in the conductive substrate is present at the weld portion of a battery case in which the conductive substrate is welded and therefore carbon is not formed at portions where welding is required or carbon is easily peeled off, the conductive substrate can be firmly welded.

Further, because metal having catalytic action with respect to the graphitization of the carbon material is iron, nickel or cobalt or an alloy containing at least one of these, a carbon electrode comprising more graphitized carbon can be obtained. Of these metals, nickel is particularly preferred in terms of cost and lack of carbide formation.

Because metal having no catalytic action with respect to the graphitization of carbon material is copper, silver, gold, platinum, palladium, tin or lead, carbon is not formed or easily peeled off, and a carbon electrode suitable for producing a nonaqueous secondary battery can be provided. Of these metals, copper is particularly preferred in terms of cost and ease of coating.

Further, because the conductive substrate contains a three-dimensional structure of nickel, the catalytic action with respect to the graphitization of carbon material can be more effectively exhibited, in addition to which an electrode having high capacity can be provided.

Also, because a carbon electrode is formed on a conductive substrate by a gas phase, a carbon electrode having desired characteristics can be formed.

Further, because a carbon electrode is formed by coating or impregnating a carbon material comprising tar, pitch or a polymer on a conductive substrate and then baking, a carbon electrode having desired characteristics can be formed.

Further still, because the nonaqueous secondary battery not only does not require peeling off of carbon from weld portions but also maintains strength, the collector can be thin or fine, and the capacity of the battery can be increased. Further, not only is the internal resistance of the battery reduced but the cycle characteristic is improved, enhancing the reliability of the battery.

What is claimed is:

1. A carbon electrode for a nonaqueous secondary battery comprising a conductive substrate doubling as a collector, the conductive substrate having a portion with carbon formed directly thereon and a portion where carbon is not formed, wherein the conductive substrate comprises a metal or a compound thereof having a catalytic action with respect to graphitization of a carbon material at the portions where carbon is formed directly thereon and comprises a metal or a compound thereof having no catalytic action with respect to graphitization of the carbon material at the portions where carbon is not formed.

2. The carbon electrode described in claim 1, wherein the portion where carbon is not formed on in the conductive substrate is present at a weld portion of a battery case in which the conductive substrate is received by welding.

3. The carbon electrode described in claim 1, wherein the metal having catalytic action with respect to graphitization of the carbon material is one of iron, nickel or cobalt and an alloy containing at least one thereof.

4. The carbon electrode described in claim 3, wherein the metal having catalytic action with respect to the graphitization of the carbon material is nickel.

5. The carbon electrode described in claim 1, wherein the metal having no catalytic action with respect to the graphitization of the carbon material is one of copper, silver, gold, platinum, palladium, tin and lead.

6. The carbon electrode described in claim 5, wherein the metal having no catalytic action with respect to the graphitization of the carbon material is copper.

7. The carbon electrode described in claim 1, wherein the conductive substrate contains a three-dimensional structure of nickel.

8. A nonaqueous secondary battery comprising a rechargeable positive electrode, a rechargeable negative electrode and an ion conductor maintained in a separator provided between both electrodes, wherein the negative electrode is a carbon electrode formed directly on a conductive substrate doubling as a collector, the conductive substrate having a portion with the carbon electrode formed directly thereon and a portion devoid of carbon and the conductive substrate contains a metal or a compound thereof having catalytic action with respect to the graphitization of a carbon material at a portion where carbon is formed directly thereon and has a metal or a compound thereof having no catalytic action with respect to the graphitization of the carbon material at a portion where carbon is not required to be formed from the carbon source.

9. A carbon electrode for a nonaqueous secondary battery comprising a conductive substrate doubling as a collector, the conductive substrate having a portion with carbon formed directly thereon and a portion where carbon is not formed, wherein the conductive substrate comprises a first metal or a compound thereof selected from the group consisting of iron, nickel, cobalt and alloys thereof where carbon is formed directly thereon and a second metal or a compound thereof selected from the group consisting of copper, silver, gold, platinum, palladium, tin and lead where carbon is not formed.

10. The carbon electrode described in claim 9, wherein the first metal is nickel and the second metal is copper.

* * * * *